United States Patent
Boyee et al.

(10) Patent No.: US 6,569,243 B2
(45) Date of Patent: May 27, 2003

(54) METHOD AND APPARATUS FOR COATING AN ELECTRIC COIL INCLUDING VIBRATION

(75) Inventors: William F. Boyee, Vandalia, OH (US); Christopher R. Spejna, Vandalia, OH (US)

(73) Assignee: Odawara Automation, Inc., Tipp, OH (US)

( * ) Notice: Subject to any disclaimer, the term of this patent is extended or adjusted under 35 U.S.C. 154(b) by 0 days.

(21) Appl. No.: 09/781,576

(22) Filed: Feb. 12, 2001

(65) Prior Publication Data

US 2001/0046554 A1 Nov. 29, 2001

Related U.S. Application Data

(60) Provisional application No. 60/184,240, filed on Feb. 23, 2000.

(51) Int. Cl.[7] .................................................. B05C 11/00
(52) U.S. Cl. .......................................... 118/57; 118/66
(58) Field of Search ............................. 118/57, 317, 66, 118/72; 427/116, 117, 424, 314, 346, 421

(56) References Cited

U.S. PATENT DOCUMENTS

| | | | | |
|---|---|---|---|---|
| 2,657,668 A | * | 11/1953 | Maier | |
| 2,661,307 A | * | 12/1953 | Foster | |
| 3,456,615 A | * | 7/1969 | Zander et al. | |
| 3,640,767 A | * | 2/1972 | Fulton et al. | |
| 3,660,136 A | | 5/1972 | Guilbault et al. | 117/17 |
| 4,160,926 A | | 7/1979 | Cope et al. | 310/215 |
| 4,425,376 A | * | 1/1984 | Lee | |
| 4,468,420 A | * | 8/1984 | Kawahara et al. | |
| 5,328,975 A | | 7/1994 | Hanson et al. | 528/29 |
| 5,401,531 A | | 3/1995 | Faraoni et al. | 427/12.7 |
| 5,470,615 A | | 11/1995 | Sbalchiero et al. | 427/459 |
| 5,474,799 A | | 12/1995 | Thigpen et al. | 427/104 |
| 5,693,371 A | | 12/1997 | Rodzewich et al. | 427/421 |
| 5,716,663 A | | 2/1998 | Capote et al. | 427/96 |
| 5,801,217 A | | 9/1998 | Rodzewich et al. | 523/409 |
| 5,908,522 A | | 6/1999 | Lofstrom et al. | 156/94 |
| 5,953,832 A | | 9/1999 | Rosynsky et al. | 34/403 |
| 5,985,048 A | | 11/1999 | Wahlert et al. | 148/272 |

* cited by examiner

*Primary Examiner*—Brenda A. Lamb
(74) *Attorney, Agent, or Firm*—Thompson Hine LLP

(57) ABSTRACT

A method for coating an electric coil of a workpiece. A step of the method includes applying a curable coating material to the electric coil of the workpiece. Another step includes externally vibrating the workpiece before the applied curable coating material has cured. An embodiment of apparatus for coating an electric coil of a workpiece includes a mechanism for applying a curable coating material to the electric coil of the workpiece and also includes a mechanism for externally vibrating the workpiece before the applied curable coating material has cured.

5 Claims, 3 Drawing Sheets

METHOD AND APPARATUS FOR COATING AN ELECTRIC COIL INCLUDING VIBRATION

CROSS REFERENCE TO RELATED APPLICATIONS

The present application claims priority of U.S. Provisional Application No. 60/184,240 filed Feb. 23, 2000, the entire disclosure of which is incorporated herein by reference.

BACKGROUND OF THE INVENTION

The present invention relates generally to electric coils, and more particularly to a method and apparatus for coating an electric coil.

Workpieces, such as parts of electric motors including armatures, stators, and the like, have electric coils which are often coated with a resin to immobilize together coil windings with adjacent coil windings and immobilize together coil windings with adjacent non-coil structure of the workpiece. For example, when manufacturing armatures, a known coating technique is to trickle a resin onto the wire windings (i.e., the electric coil) of the armature as the armature rotates about its longitudinal axis. Once cured, the resin locks the wires together to reduce excessive vibration of the wire windings when the armature is operating in an electric motor. Without such a coating, or with an incomplete coating having void spaces, excessive vibration of the insulated wire of the wire windings of the electric coil typically leads to a break in the insulation and a shorting out of the electric motor.

In the background section of U.S. Pat. No. 4,160,926, a vat is disclosed which is filled with a varnish, and then the wound stator portion of a motor or generator is immersed in the varnish and removed from the varnish for the varnish coating to polymerize in the atmosphere or in an oven. It is stated that the varnishes can be used in connection with ultrasonic vibration to improve varnish coverage for tight windings or when optimum penetration of the varnish in the shortest period of time is desired.

In U.S. Pat. No. 5,474,799, a liquid resin dispenser is disclosed for coating an electromagnetic coil with resin. Alternating electric current, with a frequency of 25–50 hertz, is supplied to the coil to heat the coil before coating. The alternating current also induces vibration in the coil which promotes migration of the catalyzed resin material into the interstices of the coil. The frequency of the alternating current is selected to promote migration without vibrating the catalyzed resin material off of the coil. It is noted that electric-current heating of the electric coil does not substantially heat the workpiece core and thus fails to promote good resin flow to immobilize together coil windings with adjacent non-coil structure of the workpiece.

In order to prepare the workpieces for the application of resin to the electric coil, the workpieces typically are preheated to aid the flow of resin on the electric coil of the workpiece. Preheating the workpieces helps to "wick" the resin onto unexposed portions of the coil windings and into the spaces between coil windings and adjacent coil windings and between coil windings and adjacent non-coil structure of the workpieces through a capillary action. In order to more quickly cure the resin, the workpieces typically are post-heated after being coated with the resin.

Workpieces typically are preheated and post-heated by passing the workpieces under radiant heating elements. However, when using radiant heating elements, the distance between the workpieces and the radiant heating elements must be maintained at precise levels to avoid overheating or underheating of the workpieces. Furthermore, the sequence timing (i.e. the residence time of a workpiece underneath a radiant heating element) must be precisely controlled to avoid overheating or underheating of the workpieces. For example, if the conveyor that transports the workpieces must be temporarily shut down for maintenance, overexposure of the workpieces to the radiant heating elements may damage the workpieces.

U.S. Pat. No. 5,401,531 discloses that workpieces can be preheated and post-heated in ovens (before and after trickle coating their electric coils with a resin) by introducing high-temperature, undoubtedly-low-velocity (i.e., less than 50 feet per minute) air into the ovens from blowers and conventional heat exchangers. The blowers are aligned away from the workpieces which travel along a serpentine-shaped conveyor path toward, and away from, the blowers. All exterior surfaces of the workpieces are exposed to air of substantially the same temperature in an oven, and the workpieces require a significant period of time to absorb the ambient heat in an oven. These ovens also requires a relatively large amount of space.

Applicant is aware of an oven used to preheat workpieces (before trickle coating their electric coils with a resin), wherein high-temperature, low-velocity (believed to be less than 50 feet per minute) air enters the oven from a line of spaced-apart holes in a side of a manifold. The workpieces travel, in start-and-stop stages, along a serpentine path in the oven at a constant distance of between 5 and 8 inches from the side of the manifold having the holes. Each workpiece is stopped, in turn, during a same one of the start-and-stop stages, opposite a same one of the holes. It is not known if the workpieces stop opposite any of the other holes. The longitudinal axis of each workpiece is aligned parallel to the central axes of the holes. All exterior surfaces of the workpieces are exposed to air of substantially the same temperature in the oven, and the workpieces require a significant period of time to absorb the ambient heat in the oven. This oven also requires a relatively large amount of space.

Applicant also is aware of ovens in some restaurants which heat a piece of food by blowing high-temperature, high-velocity (i.e., greater than 500 feet per minute) air directly onto the piece of food.

What is needed is an improved method and apparatus for coating an electric coil of a workpiece.

SUMMARY OF THE INVENTION

A first method of the invention is for coating an electric coil of a workpiece and includes steps a) and b). Step a) includes applying a curable coating material to the electric coil of the workpiece. Step b) includes externally vibrating the workpiece before the applied curable coating material has cured. Preferably, step b) is performed during step a). Preferably, step b) essentially avoids heating the workpiece.

An embodiment of the invention is apparatus for coating an electric coil of a workpiece. The apparatus includes a mechanism for applying a curable coating material to the electric coil of the workpiece. The apparatus also includes a mechanism for externally vibrating the workpiece before the applied curable coating material has cured. Preferably, the vibrating mechanism externally vibrates the workpiece as the curable coating material is being applied to the electric coil of the workpiece. Preferably, the applying mechanism includes a liquid-resin trickle dispenser, and the vibrating mechanism includes a vibrator operatively connectable to the workpiece.

Several benefits and advantages are derived from the invention. Vibrating the workpiece promotes migration of the coating material into the spaces between coil windings and adjacent coil windings and between coil windings and adjacent non-coil structure of the workpiece. Vibrating reduces void spaces which improves immobilization of coil windings with adjacent coil windings and improves immobilization of coil windings with adjacent non-coil structure of the workpiece. Improved immobilization reduces excessive vibration of the insulated wire of the of wire windings of the electric coil which typically leads to a break in the insulation and a shorting out of the electric motor. Vibrating may decrease the time required for the coating material to saturate the workpiece. Externally vibrating the workpiece, in contrast to internally vibrating (and thus heating) the electric coil by applying an alternating electric current to the electric coil, allows independent and optimal control of workpiece temperature and vibration. Applicants have externally vibrated workpieces (which were pre-heated, but pre-heating is not considered to be required to obtain benefits from external vibration) during trickle coating of the electric coil of the workpieces, then have cut the workpieces open, and have found the coating on the electric coil showed substantially fewer void spaces than when Applicants trickle coated without external vibration.

DETAILED DESCRIPTION

Figure 1:
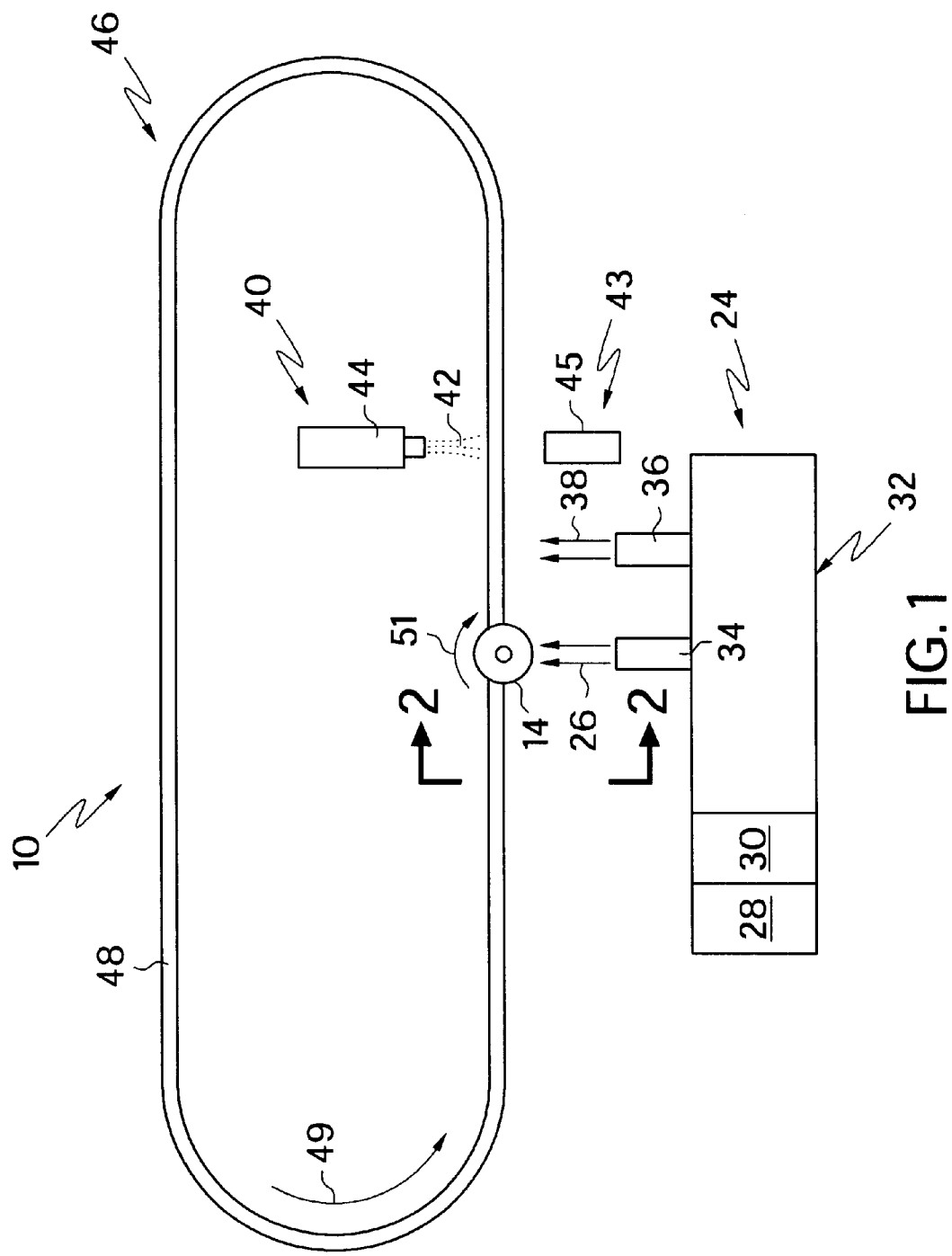
FIG. 1 is a diagrammatic, front-elevational view of a first embodiment of apparatus for coating an electric coil of a workpiece.
Figure 2:
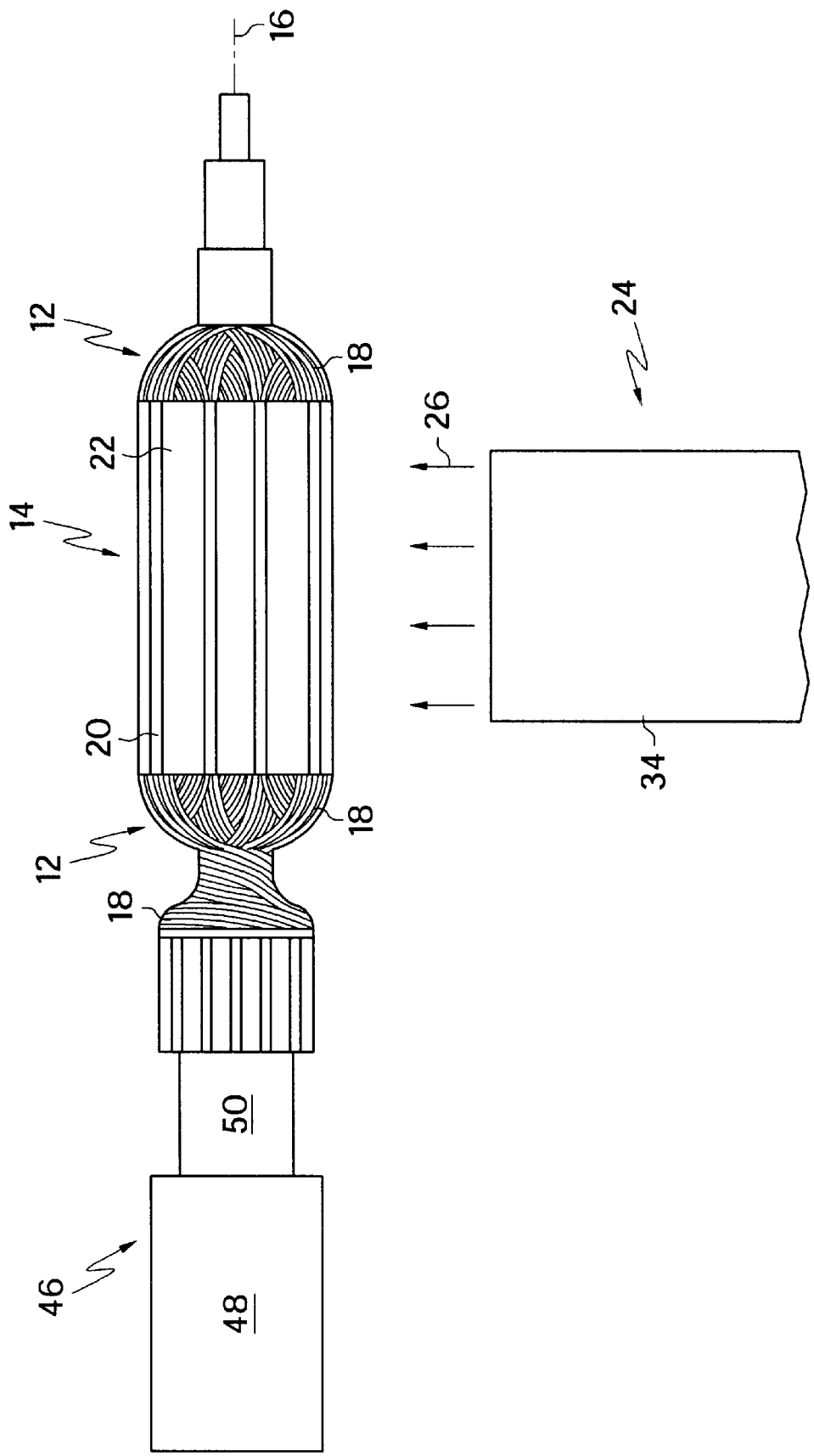
FIG. 2 is a diagrammatic, cross-sectional view of a portion of the apparatus of FIG. 1 taken along lines 2—2 of FIG. 1 with the conveyor shown in relatively larger size.
Figure 3:
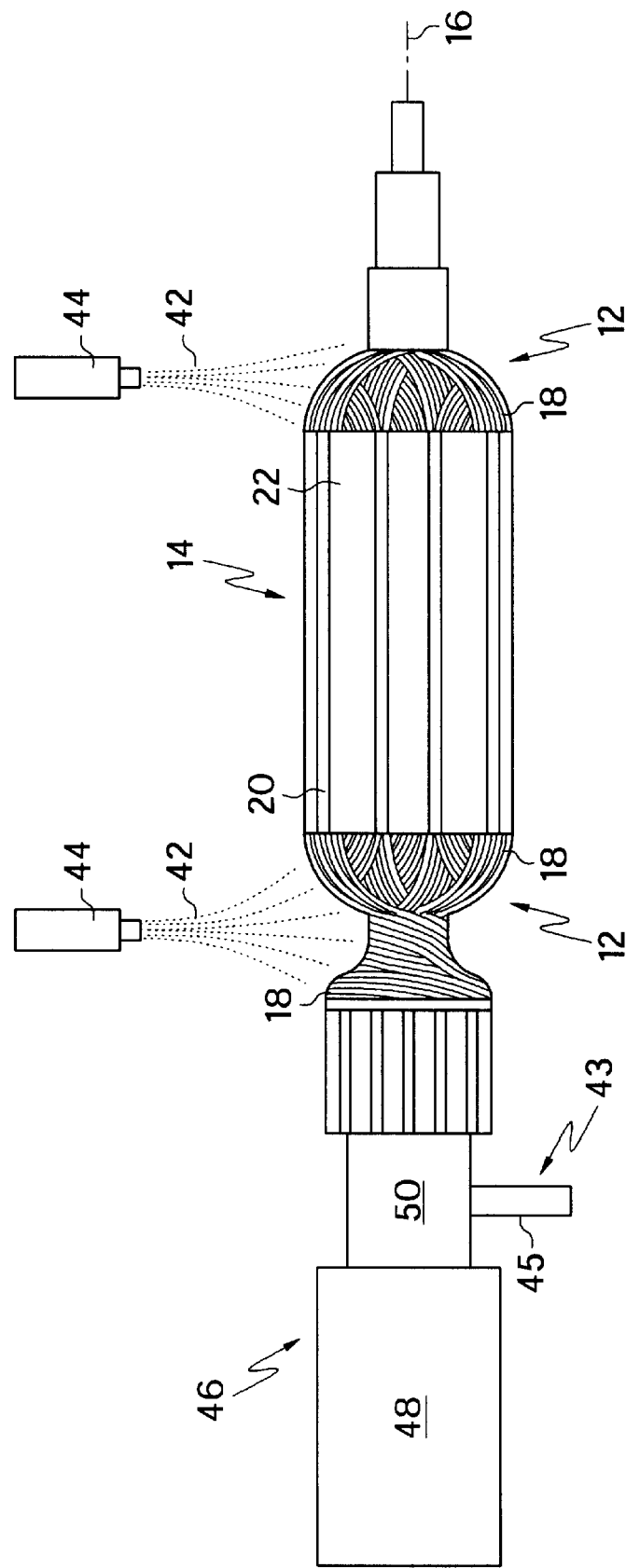
FIG. 3 is a diagrammatic view, as in FIG. 2, but of the liquid-resin trickle dispenser, vibrator, conveyor, and rotating chuck portions of the apparatus of FIG. 1 with the workpiece having been moved by the conveyor to the liquid-resin dispenser and vibrator portions of the apparatus of FIG. 1.

Referring to FIGS. 1–3, a first embodiment of the invention is apparatus 10 for coating an electric coil 12 of a workpiece 14. Examples of the workpiece 14 include, without limitation, an armature (such as that shown in the figures) for an electric motor or generator and a stator (not shown in the figures) for an electric motor or generator. Preferably, the workpiece 14 has a longitudinal axis 16, and the electric coil 12 has wire windings 18 wound in longitudinally-extending slots 20 of the workpiece core 22. In one construction, the workpiece core 22 comprises iron, and the electric coil 12 comprises insulation-covered copper wire. Coating the electric coil 12 immobilizes together the wire windings 18 with adjacent wire windings 18 and immobilizes together wire windings 18 with adjacent non-coil structure (e.g., the workpiece core 22) of the workpiece 14. Without such coating, or with incomplete coating having void spaces, excessive vibration of the insulated wire of the of wire windings 18 of the electric coil 12 typically leads to a break in the insulation of the insulated wire and a shorting out of the electric motor or generator.

The apparatus 10 includes means (also referred to as applying means or second means 40) for applying a curable coating material 42 to the electric coil 12 of the workpiece 14. The apparatus 10 also includes means 43 for externally vibrating the workpiece 14 before the applied curable coating material 42 has cured. Preferably, the vibrating means 43 is disposed proximate the second means 40 so that the both the second means 40 and the vibrating means 43 operate on the workpiece 14 at a single workpiece location (which is referred to as the location or station of the second means 40). Preferably, the vibrating means 43 externally vibrates the workpiece 14 as the curable coating material 42 is being applied to the electric coil 12 of the workpiece 14 by the second means 40. It is noted, by way of contrast, that using alternating electric current to vibrate the electric coil of the workpiece is an example of internally vibrating the workpiece.

Preferably the second means 40 includes a liquid-resin trickle dispenser 44. Two trickle dispensers 44 are shown in FIG. 3. Each trickle dispenser 44 dispenses liquid resin onto a corresponding one of the two exposed end portions of the electric coil 12. One example of the curable coating material 42 is Pedigree™ No. 6183 Polyester Trickle Resin "Generation III" manufactured by the P. D. George Company of St. Louis, Mo. In other examples, not shown, for applying the curable coating material 42, the second means 40 includes a sprayer for spray-coating the electric coil 12 of the workpiece 14, a coating brush, a coating sponge, a liquid-resin pouring dispenser, a liquid-resin dispensing nozzle, and the like. A further second means 40 includes a liquid-resin trickle dispenser 44 with a movable arm (not shown) to present a non-rotating workpiece 14 in different alignments to the trickle dispenser 44. It is noted that the example shown in the figures includes a rotating workpiece 14 presented to the liquid-resin trickle dispenser 44. Other examples, not shown, of the second means 40 include a shallow bath apparatus.

Preferably, the vibrating means 43 includes a vibrator 45 operatively connectable to the workpiece 14. The vibrator 45 itself vibrates and is a separate component from any portion of the workpiece 14. The vibrator 45 may be powered by any source, and examples of vibrators include, without limitation, pneumatic-actuated vibrators and piezoelectric vibrators. In one example, shown in FIG. 3, the vibrator 45 makes direct vibrating contact with a chuck 50 (to be described later) holding the workpiece 14. In another example, not shown, the vibrator 45 makes direct vibrating contact with the workpiece 14 itself. In one variation, not shown, the vibrator 45 makes direct vibrating contact with a non-coil portion of the workpiece 14. In another variation, not shown, the vibrator 45 makes direct vibrating contact with the electric coil 12 of the workpiece 14. In one design, shown in FIG. 3, the vibrator 45 vibrates back and forth along a direction substantially perpendicular to the longitudinal axis 16 of a workpiece 14 having a longitudinal axis. In another design, not shown, the vibrator 45 vibrates back and forth along a direction substantially parallel to the longitudinal axis 16 of a workpiece 14 having a longitudinal axis. It is noted that the vibration need not be along a single direction. Other examples not shown, of the vibrating means 43 include a sonic vibration apparatus.

The apparatus 10 optionally provides for heating the workpiece 14 including pre-heating the workpiece 14 before applying the coating material 42 and/or post-heating the workpiece 14 after applying the coating material 42. The apparatus 10 optionally includes first means 24 for heating the workpiece 14.

Preferably, the first means 24 directs a first heated gas flow 26 to impinge on the workpiece 14, wherein the first heated gas flow 26 first impinging the workpiece 14 has a velocity of at least generally 500 feet per minute. The velocity is measured by an instrument (not shown), such as an anemometer, whose sensor is placed at the location to be occupied by the portion of the workpiece 14 to be first impinged by the first heated gas flow 26. Preferably, the first heated gas flow 26 first impinging the workpiece 14 has a velocity between generally 500 feet per minute and generally 2500 feet per minute. More preferably, the first heated gas flow 26 first impinging the workpiece 14 has a velocity between generally 500 feet per minute and generally 1500 feet per minute. Preferably, the first heated gas flow 26 first impinging the workpiece 14 has a temperature between generally 200 degrees Fahrenheit and generally 400 degrees Fahrenheit. The temperature is measured by an instrument (not shown), such as a thermometer, whose sensor is placed at the location to be occupied by the portion of the workpiece 14 to be first impinged by the first heated gas flow 26. More preferably, the first heated gas flow 26 first impinging the workpiece 14 has a temperature between generally 275 degrees Fahrenheit and generally 325 degrees Fahrenheit.

Preferably, the first means 24 includes a blower 28, a heater 30, a manifold 32, and a first nozzle 34 operatively connected together so that the blower 28 blows gas, such as air, past the heater 30 and into the manifold 32 with a first heated gas flow 26, such as a heated air flow, exiting the first nozzle 34 of the manifold 32. Preferably, the first nozzle 34 is a position-adjustable first nozzle which is movable vertically and horizontally to accommodate different workpieces. Preferably, the first nozzle 34 has a removable outlet tip allowing interchanging with different-shaped outlet tips to accommodate different workpieces. In one construction, the first nozzle 34 has a centerline which is substantially straight for a first length inward from the exit of the first nozzle, and the first length is greater than any inside nozzle dimension of the first nozzle 34 which is perpendicular to the centerline. In one variation, the first means 24 also includes a second nozzle 36 in fluid communication with the manifold 32 such that a second heated gas flow 38 exits the second nozzle 36 of the manifold 32. In one modification, each of the first and second nozzles 34 and 36 has its own pivotal damper plate, not shown, to regulate, and allow balancing of, the flow velocity in each nozzle 34 and 36. Another example, not shown, of a mechanism which produces a directed heated gas flow is a hot air gun. An additional example, not shown, of a mechanism which produces a directed heated gas flow would replace the previously-discussed first nozzle 34 of the manifold 32 with a first orifice of the manifold 32 (i.e., an opening which does not protrude above the surrounding portion of the manifold).

Further examples, not shown, of the first means 24 for heating the workpiece 14 include a radiant heater, a convection oven, a transmission wire operatively connectable to a source of alternating electric current and operatively connectable to the electric coil 12 of the workpiece 14 to heat the electric coil 12, and an induction coil heater such as a microwave oven, and the like.

The apparatus 10 optionally includes third means 46 for relatively transporting the workpiece 14 between the first means 24 and the second means 40. Preferably, the third means 46 includes a chain-driven conveyor 48 transporting a rotating chuck 50 which releasably holds the workpiece 14. The rotating chuck 50 rotates the workpiece 14 about its longitudinal axis 16. Typically, the conveyor 48 has a multiplicity of equally-spaced-apart rotating chucks to hold a multiplicity of workpieces. Preferably when pre-heating (i.e., heating the workpiece 14 before applying the coating material 42) only, as shown in FIG. 1, the conveyor 48 is controllable to stop the chuck 50 (while allowing rotation of the chuck about directional arrow 51) at the first means 24, to transport the chuck 50 (along directional arrow 49) from the first means 24 to the second means 40, and to stop the chuck 50 (while allowing rotation of the chuck about directional arrow 51) at the second means 40. In one variation, the conveyor 48 stops the chuck 50 (while allowing rotation of the chuck) at the first nozzle 34, transports the chuck 50 from the first nozzle 34 to the second nozzle 36, and stops the chuck 50 (while allowing rotation of the chuck) at the second nozzle 36. In one implementation, the conveyor 48 stops the chuck 50 at each of the first and second nozzles 34 and 36 so that the workpiece 14 is disposed apart from the corresponding nozzle a distance of between generally one inch and three inches.

Preferably, when post-heating (i.e., heating the workpiece 14 after applying the coating material 42) only, the conveyor 48 would operate in a direction opposite to directional arrow 49, and the chuck 50 would rotate in a direction opposite to directional arrow 51. Preferably when pre-heating and post-heating, the apparatus 10 would include an additional first means, not shown, substantially identical to the first means 24 and disposed downstream from the second means 40, wherein the conveyor 48 moves along directional arrow 49 from the first means 24 to the second means 40 and from the second means 40 to the additional first means.

In one design, not shown, the manifold 32 of the first means 24 includes a total of five to twenty or more nozzles (i.e., five to twenty or more pre-heat or post-heat stations) enclosed by an open-ended tunnel enclosure, not shown, through which the conveyor 48 passes, with some pre-heating of the workpiece 14 occurring at four or more pre-enclosure stations from the heated airflow leaving the workpiece entrance end of the tunnel enclosure. In one process, the workpiece 14 spends generally five to sixty or more seconds at each pre-enclosure station, at each pre-heat station, at the trickle-dispenser station, and at each post-heat station.

It is noted that some coating materials 42 significantly benefit from preheating but not from post-heating because they will cure easily at ambient conditions. It also is noted that coating materials may be developed which would not significantly benefit from pre-heating but curing would be significantly faster with post-heating. When pre-heating and post-heating occur, in some applications, the pre-heating is performed by the first means 24 and a conventional heating method (such as radiant heating) performs the post-heating, and, in other applications, the post-heating is performed by the first means 24 and a conventional heating method (such as radiant heating) performs the pre-heating.

Another third means 46, not shown, includes a movable arm to transport the workpiece 14 between the first means 24 and the second means 40. A further third means 46, not shown, includes a movable arm to transport the first means 24 to and from the workpiece 14 and the same or a different movable arm to transport the second means 40 and the vibrating means 43 to and from the workpiece 14.

A first method of the invention is for coating an electric coil 12 of a workpiece 14 and includes steps a) and b). Step a) includes applying a curable coating material 42 to the electric coil 12 of the workpiece 14. Step b) includes externally vibrating the workpiece 14 before the applied curable coating material 42 has cured.

Preferably, in the first method, step b) is performed during step a). It is also preferred, in the first method, that step b) include applying an external vibration force to the workpiece 14 at a location on the workpiece 14 apart from the electric coil 12. In one implementation of the first method, step b) essentially avoids heating the workpiece 14.

In one example of the first method, the workpiece 14 has a longitudinal axis 16, and step b) vibrates the workpiece 14 essentially only back and forth along a direction substantially parallel to the longitudinal axis 16. In another example of the first method, the workpiece 14 has a longitudinal axis 16, and step b) vibrates the workpiece 14 essentially only back and forth along a direction substantially perpendicular to the longitudinal axis 16 of the workpiece 14. In other examples, the vibration is not along a single direction. Preferably, the workpiece 14 has a natural frequency, and step b) vibrates the workpiece 14 substantially at the natural frequency.

In an additional example of the first method, the workpiece 14 has a longitudinal axis 16, and the first method also includes, during step a), the step of rotating the workpiece 14 about the longitudinal axis 16. In a further example of the first method, the curable coating material 42 is a liquid comprising a resin, and step a) includes trickling the curable coating material 42 onto the electric coil 12 of the (rotating or non-rotating) workpiece 14.

The first method optionally includes the step of heating the workpiece 14. In one variation of the heating step, the heating step includes pre-heating the workpiece 14 before applying the coating material 42. In another variation of the heating step, the heating step includes post-heating the workpiece 14 after applying the coating material 42. In an additional variation of the heating step, the heating step includes pre-heating and post-heating. In one example of the heating step, the heating step includes directing a first heated gas flow 26 to impinge on the workpiece 14, wherein the first heated gas flow first impinging the workpiece has a velocity of at least generally 500 feet per minute. In one application, the first heated gas flow 26 is directed to impinge the workpiece 14 substantially perpendicular to the longitudinal axis 16 of the workpiece 14 while the workpiece 14 rotates about the longitudinal axis 16. Preferably, the optional heating step essentially avoids vibrating the workpiece 14.

In some examples of the methods and apparatus of the invention, not shown, only a single nozzle (e.g., first nozzle 34) is used to heat the workpiece 14. In other examples, a plurality of nozzles (e.g., the first and second nozzles 34 and 36) are located at a variety of locations, or stations, to heat the workpiece as it is indexed downstream during processing. Each station may be individually adjusted to blow air of different temperatures, or at different velocities, to maximize the efficiency of transfer of heat from the nozzles to the workpiece.

The use of forced air substantially increases the overall heat transfer coefficient, and shortens the time required to heat a workpiece, compared to the use of radiant heating elements. This provides greater control over the temperature of the tunnel enclosure, the heating time, and the temperature of the workpiece, and enables the size of the machine which heats the workpieces to be reduced. As previously mentioned, the forced air can be maintained at a temperature at, or slightly above, the desired end temperature of the workpiece. The heated air is thus maintained at a much lower temperature than radiant heating elements, and is therefore is less likely to damage the workpiece. Furthermore, when using this method of heating workpieces, the temperature of the workpiece can be more consistently controlled, and the mass of the workpieces traveling through the tunnel enclosure do not affect the temperature within the tunnel enclosure. The heating system of the present invention can also be quickly raised from a "cold" (i.e. shutdown) state to the desired operating temperature.

In one construction, not shown, the heated air exhausted by the nozzles is captured after it flows across the workpieces and recirculated to conserve heat and energy. In one design, the nozzles may be located in a chamber that has an exhaust conduit to capture and recirculate heated air in the chamber. Other methods and mechanisms of recirculating the heated air may be used without departing from the scope of the invention.

Several benefits and advantages are derived from the invention. Vibrating the workpiece promotes migration of the coating material into the spaces between coil windings and adjacent coil windings and between coil windings and adjacent non-coil structure of the workpiece. Vibrating reduces void spaces which improves immobilization of coil windings with adjacent coil windings and improves immobilization of coil windings with adjacent non-coil structure of the workpiece. Improved immobilization reduces excessive vibration of the insulated wire of the of wire windings of the electric coil which typically leads to a break in the insulation and a shorting out of the electric motor. Vibrating may decrease the time required for the coating material to saturate the workpiece. Externally vibrating the workpiece, in contrast to internally vibrating (and thus heating) the electric coil by applying an alternating electric current to the electric coil, allows independent and optimal control of workpiece temperature and vibration. Applicants have externally vibrated workpieces (which were pre-heated, but pre-heating is not considered to be required to obtain benefits from external vibration) during trickle coating of the electric coil of the workpieces, then have cut the workpieces open, and have found the coating on the electric coil showed substantially fewer void spaces than when Applicants trickle coated without external vibration.

Optional pre-heating helps to "wick" the resin onto unexposed portions of the coil windings and into the spaces between coil windings and adjacent coil windings and between coil windings and adjacent non-coil structure of the workpiece through a capillary action. Optional preheating reduces void spaces which improves immobilization of coil windings with adjacent coil windings and improves immobilization of coil windings with adjacent non-coil structure of the workpiece. Faster optional heating is achieved by directing a heated gas flow to impinge on the workpiece which also avoids workpiece overheating and underheating problems. Optional post-heating allows the applied coating material to cure more quickly.

The foregoing description of a method of the invention and an embodiment of apparatus of the invention has been presented for purposes of illustration. It is not intended to be exhaustive or to limit the invention to the precise form or steps disclosed, and obviously many modifications and variations are possible in light of the above teaching. It is intended that the scope of the invention be defined by the claims appended hereto.

What is claimed is:

1. Apparatus for coating an electric coil of a workpiece comprising:
   a) means for applying a curable coating material to the electric coil of the workpiece, wherein the applying means includes a liquid-resin trickle dispenser which is disposed over the electric coil of the workpiece during the application of the curable coating material and which trickles the curable coating material down onto the electric coil of the workpiece; and
   b) means for externally vibrating the workpiece before the applied curable coating material has cured.

2. The apparatus of claim 1, wherein the vibrating means vibrates the workpiece as the curable coating material is being applied to the electric coil of the workpiece by the applying means.

3. The apparatus of claim 1, wherein the vibrating means includes a vibrator operatively connectable to the workpiece, and wherein the vibrator itself vibrates and makes direct vibrating contact with the workpiece or a workpiece holder.

4. The apparatus of claim 1, also including first means for heating the workpiece before applying the curable coating material.

5. The apparatus of claim 4, wherein the first means directs a first heated gas flow to impinge on the workpiece, wherein the first heated gas flow first impinging the workpiece has a velocity of at least generally 500 feet per minute.

* * * * *